United States Patent [19]

Erichsen

[11] Patent Number: 4,977,791
[45] Date of Patent: Dec. 18, 1990

[54] FLAP LEVER SYSTEM FOR ROTARY FLAPS

[75] Inventor: Volker Y. Erichsen, Recklinghausen, Fed. Rep. of Germany

[73] Assignee: Stober & Morlock, Warmekraft Gesellschaft mbH, Recklinghausen, Fed. Rep. of Germany

[21] Appl. No.: 277,807

[22] Filed: Nov. 30, 1988

[30] Foreign Application Priority Data

Nov. 30, 1987 [DE] Fed. Rep. of Germany ... 8715838[U]

[51] Int. Cl.$^5$ .......................... F16K 1/18; F16K 31/44
[52] U.S. Cl. ........................................... 74/470; 74/96; 251/58; 251/232; 251/243
[58] Field of Search ............... 74/96, 98, 470; 251/58, 251/229, 232, 242, 243

[56] References Cited

U.S. PATENT DOCUMENTS 2,708,093  5/1955  Leber ...................................... 251/58
3,307,583  3/1967  Harter ................................... 251/232
4,236,422 12/1980  Cochran et al. ....................... 74/470
4,412,556 11/1983  Janich .................................. 74/470

Primary Examiner—Leslie A. Braun
Assistant Examiner—Scott Anchell
Attorney, Agent, or Firm—James Creighton Wray

[57] ABSTRACT

The invention regards a flap linkage for several rotary flaps arranged along a parallel axis and positioned within a frame. The rotary flap shafts have a double-armed lever on each end. Transmission elements of an adjustment gear mesh on the arms of the double-armed lever. The transmission elements are rigid pushrods, and the levers have been configured in an articulated manner on the ends of the rotary flap shafts. The swivel axes of the levers are parallel to a line that intersects the rotation axes of the pushrods at the lever arms. Hubs have been rigidly connected to the ends of the rotary flap shafts. The hubs are supported with the aid of springs against the intermediate levers mounted on the ends of the rotary flap shafts.

5 Claims, 2 Drawing Sheets

FLAP LEVER SYSTEM FOR ROTARY FLAPS

BACKGROUND OF THE INVENTION

1. Field of the Invention

The invention concerns a flap linkage for several rotary flaps configured on a parallel axis within a frame whose rotary flap shafts have a straight double-armed lever on each end. Transmission elements of adjusting means operate on the arms of the double-armed lever. The transmission elements are rigid pushrods and the levers are joined in an articulated manner at the ends of the rotary flap shafts. The swivel axes of the levers are parallel to a line that intersects the rotation axes of the pushrods at the lever arms.

2. Prior Art

Such a flap linkage is known from DE-PS 22 44 972. In this flap linkage the rotary flap shafts are kept free of bending moments, even when frame length fluctuations, or distance changes between the rotary flap shafts, take place due to temperature influences. Even though in the known flap linkages all flap wings are adjusted equally, it has been proven that, especially in the event of a configuration with multiple flaps, small leakages might occur, especially if dust has been deposited within the flap seat range.

The invention is based on the task of also eliminating this deficiency.

SUMMARY OF THE INVENTION

The object of the invention consists of a flap linkage for operating several rotary flaps arranged in parallel within a frame in which the rotary flap shafts have been configured with a straight double-armed lever at each end. Transmission elements of adjusting means operate on the arms of the double-armed lever. The transmission elements are rigid pushrods and the levers have been fastened in an articulated manner onto the ends of the rotary flap shafts. The swivel axes of the pushrods are parallel to a line that intersects the rotation axes of the pushrods at the lever arms, characterized by having hubs rigidly connected to the ends of the rotary flap shafts. The hubs are supported by springs placed against the ends of the rotary flap shafts.

In the configuration according to the invention, all flaps shut completely. The pressure between the flap wings and seats, or between the gaskets, is within a predetermined range, even when the seat or gasket positions of individual flaps differ slightly from those of other flaps.

In a preferred implementation form of the flap linkage according to the invention, the rotary flap shafts have been symmetrically equipped with two springs. This makes it possible to avoid the introduction of unequal forces into the levers and pushrods, and also, prevents undesired bending moments from acting upon the rotary flap shafts.

It is also appropriate to arrange the longitudinal spring axes vertically to the longitudinal axes of the levers. This makes it possible to achieve spring loading that is free of bending moments, and the ideal characteristics of the spring also remain free of such moments. If the springs are configured as cup springs (which is preferred) the same are not subjected to an uneven wear.

These and other and further objects and features of the invention are apparent in the disclosure which includes the above and ongoing specification with the claims and the drawings.

BRIEF DESCRIPTION OF THE DRAWINGS

With the aid of the figure, an implementation example of a flap linkage according to the invention has been illustrated as follows.

DETAILED DESCRIPTION OF THE DRAWING

Figure 1:
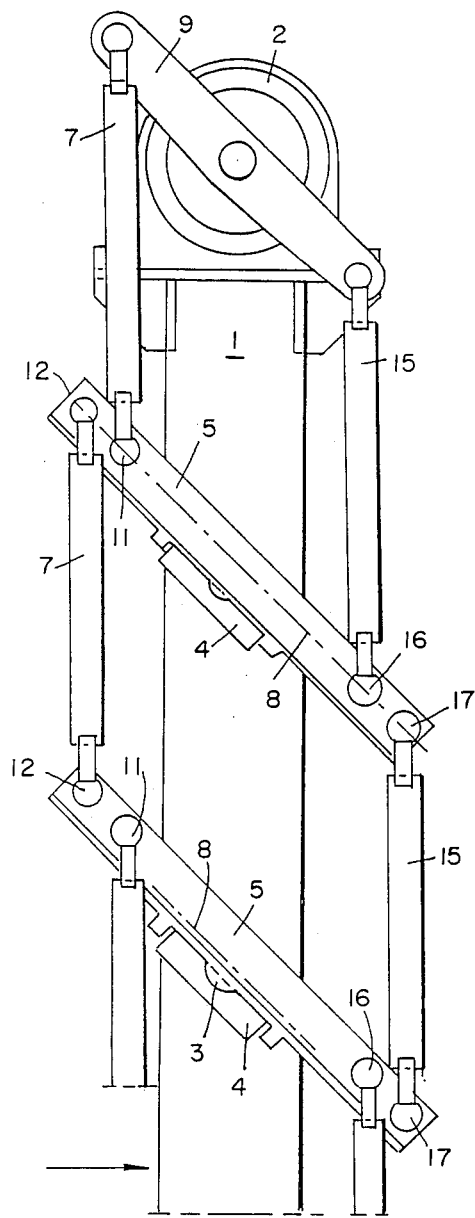
FIG. 1 In a schematic representation, the drive side of a flap with flap linkage.

Now referring to the drawings, the flaps shown in FIG. 1 are especially used in channels with a large cross-section, such as with attachment means 4 in flue gas channels installed in power stations. It consists of a flap frame 1 with attached gears 2, and of rotary flap shafts 3 supported on the flap frame 1.

Articulated levers 5 are attached to one end of the rotary flap shafts 3 in a manner described below articulations 4 are joint connections between rotary flap shafts 3 and articulated levers 5. The articulated levers 5 are connected in an articulated manner to one another by means of pushrods 7 and 15. The uppermost pushrods 7, 15, or those placed the furthest toward the outside, are connected to a drive lever 9 belonging to gears 2.

The pushrods 7, 15 are rigid and the arrangement has been made in such a way, that the swivel axes 8 of the articulated levers 5 are parallel to a line which intersects rotation axes 11, 12, 16, 17 of pushrods 7, 15 at the articulated levers 5.

Figure 2:
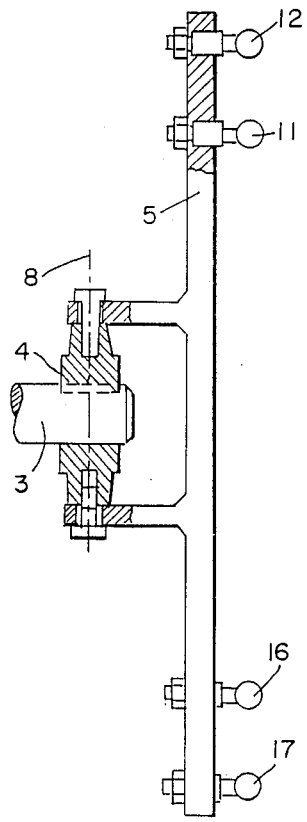
FIG. 2 a partial cross-section side view of an articulated lever.
Figure 3:
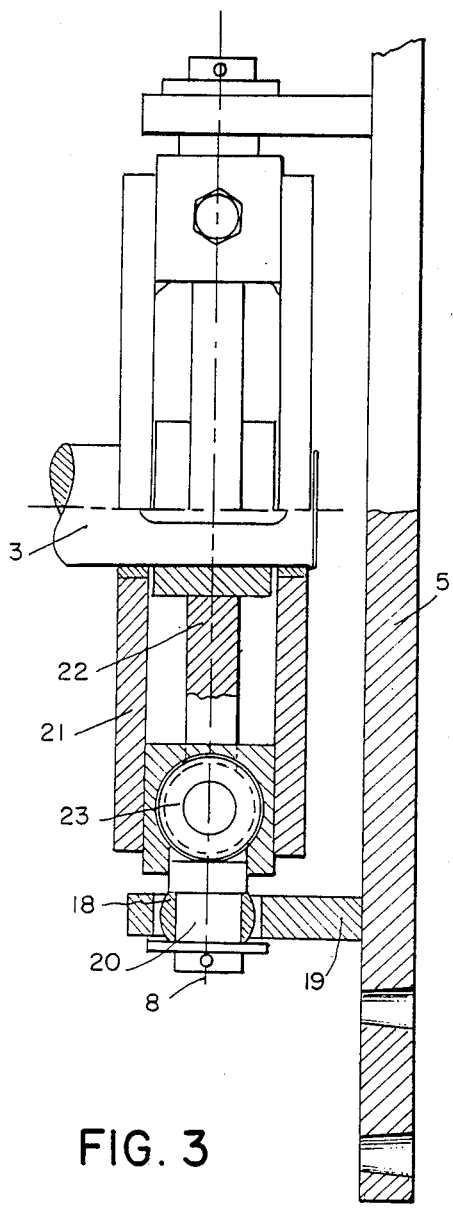
FIG. 3 an enlarged section from FIG. 2, partially as a top view and partially as a cross-section.
Figure 4:
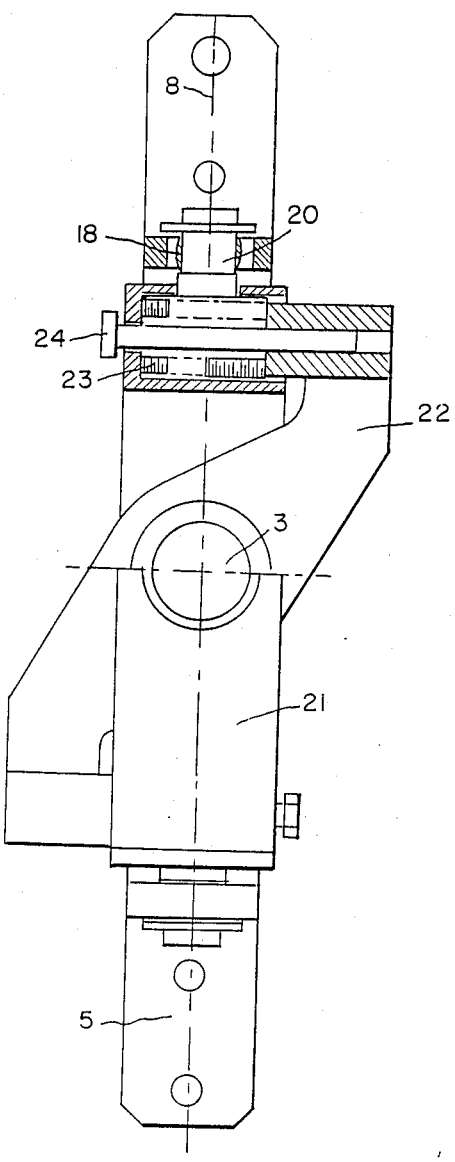
FIG. 4 an illustration according to FIG. 3, partially as a top view, and partially as a cross-section seen in the direction of the rotary flap.

As can be seen from FIG. 2, the connection of the rotary flap shafts 3 with the articulated levers 5 is accomplished in such a way, that the articulated shaft 3 may be swivelled around a swivel axis 8 against the plane of the articulated lever 5. The required bearings have been labelled with 18 in FIGS. 3 and 4 and have been placed in supports 19 which have been fastened onto the articulated levers 5. Lugs 20 have been installed in bearings 18 and into intermediate lever 21. The intermediate lever 21 is connected with the lugs that have been placed on the rotary flap shafts 3, but the levers are not rigidly connected to the rotary flap shafts. Hubs 22 are rigidly connected with the rotary flap shafts 3. The intermediate lever 21 is provided with a hollowed out section at one end into which cup spring packages 23 are inserted. "Cup spring packages" refers to several cup springs which are located on a common axis. Hubs 22 are also inserted into this hollowed area of the intermediate levers 21. Screws 24 are inserted through 21 and cup spring packages 23 into hubs 22. The hubs 22 are adjustable within the intermediate levers 21 by tightening and untightening screws 24 and using the spring action of the cup spring packages 23. As shown in FIG. 2, the intermediate levers 21 and hubs 22 are connected by articulations 4.

While the invention has been described with reference to specific embodiments, modifications and variations of the invention may be made without departing from the scope of the invention which is defined in the following claims.

We claim:

1. A flap linkage for several rotary flap shafts placed inside a frame comprising:
rotary flap shafts having straight double-armed levers with attachment means for attaching the levers to the rotary flap shafts at ends of the rotary flap shafts;
transmission elements are attached on arms of the double-armed lever, wherein the transmission elements are rigid pushrods with by an attachment means for attaching the levers to the rotary flap shafts;
wherein further swivel axes of the levers are parallel to a line that intersects rotational axes of the pushrods at the lever arms;
hubs being rigidly connected to the rotary flap shafts; and
springs which support the hubs against intermediate levers, wherein the intermediate levers are placed at the ends of the rotary flap shafts.

2. Flap linkage according to claim 1, characterized by symmetrically configuring two springs for every rotary flap shaft.

3. Flap linkage according to claim 1 characterized by arranging spring axes perpendicularly to longitudinal axes of the levers.

4. Flap linkage according to claim 1 characterized by configuring the springs as cup spring packages.

5. A linkage comprising:
a plurality of rotary flap shafts supported inside a frame;
intermediate levers rotatably supported at ends of said rotary flap shafts;
double-armed levers attached to said intermediate levers;
transmission elements attached to said double-armed levers for simultaneous operation of said rotary flap shafts, said transmission elements including rigid pushrods articulately mounted to said double-armed levers;
attachment means for operably connecting said double-armed levers to said rotary flap shafts including hubs rigidly connected to said rotary flap shafts, said hubs operably connected to said double-armed levers by springs whereby rotary movement of the double-armed shaft is transmitted to said rotary flap shaft through said springs and said hubs.

* * * * *